July 23, 1968  S. MATTEINI  3,393,651
PLANT FOR THE TREATMENT OF TRASH
Filed Oct. 13, 1966  2 Sheets-Sheet 1

July 23, 1968 — S. MATTEINI — 3,393,651

PLANT FOR THE TREATMENT OF TRASH

Filed Oct. 13, 1966 — 2 Sheets-Sheet 2

3,393,651
PLANT FOR THE TREATMENT OF TRASH
Silvano Matteini, Via Bellasguardo 2,
Florence, Italy
Filed Oct. 13, 1966, Ser. No. 586,466
Claims priority, application Italy, Oct. 18, 1965,
23,087/65
4 Claims. (Cl. 110—8)

ABSTRACT OF THE DISCLOSURE

A trash treatment plant, with an incineration furnace, and a sieve which separates material of a sufficiently fine size so that the percentage of organic substances is between 15% and 20%. The furnace is designed to be run for the total or partial (roasting) incineration of the trash, and collection means are provided to receive the incinerated material and/or material transformed or quickly transformable into fertilizing humus. The material is alternately conveyed in entirety into the furnace, for a total incineration, or a portion is passed through the sieve to the collection means for the forming of humus and the portion retained by the sieve is transported to the furnace for a partial incineration (roasting), and the ashes are combined with the material for the forming of humus.

---

This invention relates to plants for the treatment of trash.

Plants hitherto used for the disposal (incineration and transformation into humus) of solid trash present one or more of the following disadvantages. The plant and maintenance costs are high, as are also the running and operating charges, because of high consumption of electrical power owing to the irrationality of the cycle and owing to the labour required as a consequence of the lack of rational automation. The presently used plants also have a low respect for hygienic and sanitary standards and rules both in relation to the operators who maintain the plant and in relation to external hygiene.

It is to be noted that the characteristics or specifications of the plant should be subordinated to the requirements of the municipal cleaning service and not vice-versa. Thus, the latter should not only guarantee every day the reception of trash but should also be able to receive trash even when there is an interruption in work for any reason.

In the case of incineration, the result of the work is the slag delivered from the furnace. This slag contains ashes, debris of various kinds (bones, pots, drosses, glass, etc) as well as materials which require a slow combustion (leather, wood, books, and the like), in addition to metallic materials, mostly ferrous. The furnace does not allow for a rational use thereof, and they have substantially no commercial value.

In those cases where plant is provided for the transformation of the trash into humus it is necessary to recall that the output of the plant is a function of the trash which is delivered thereto and is not matched to the requirements of the humus market. Therefor, there is no consequent disadvantage deriving therefrom in the case in which the demand exceeds the supply, but in the converse case the excess of production, which from the economic viewpoint is advantageous, gives rise to acute storage problems.

According to the present invention there is provided in the trash disposal plant sieve means, furnace means for at least partially burning the trash, silo means for storing incinerated and other material, and means for selectively delivering from the sieve means trash to the furnace means when operated for complete combustion or to the silo means when the furnace means is operated for partial combustion.

Further according to the present invention there is provided in a trash treatment plant, sieve means having a mesh size such that the trash passed therethrough has an organic content in the range 15 to 20%.

Figure 1:
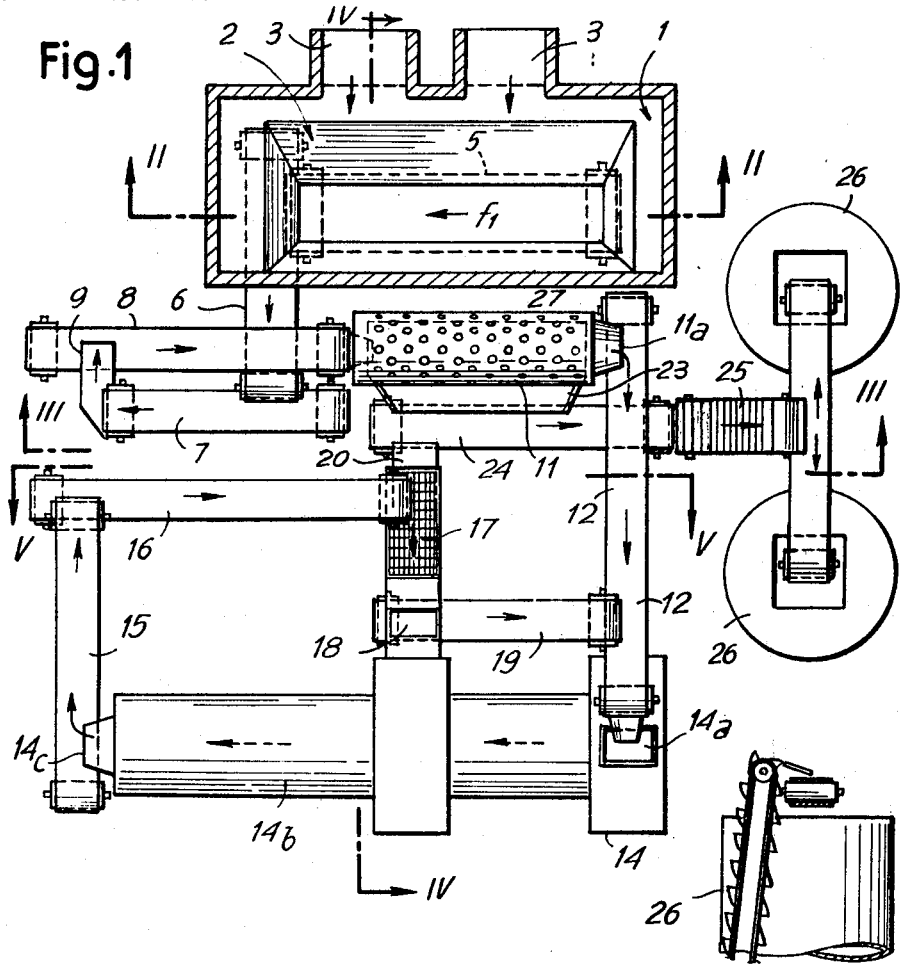
Figure 3:
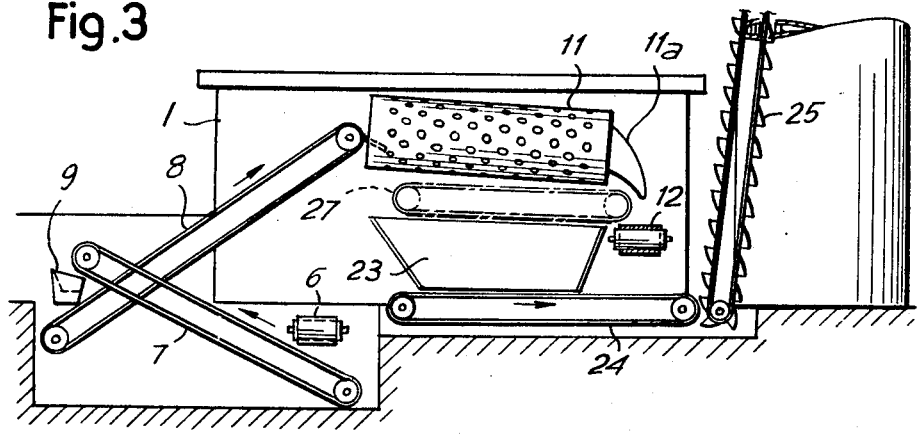
Figure 2:
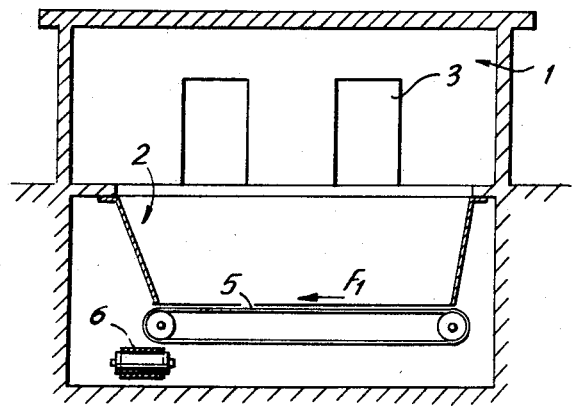
Figure 4:
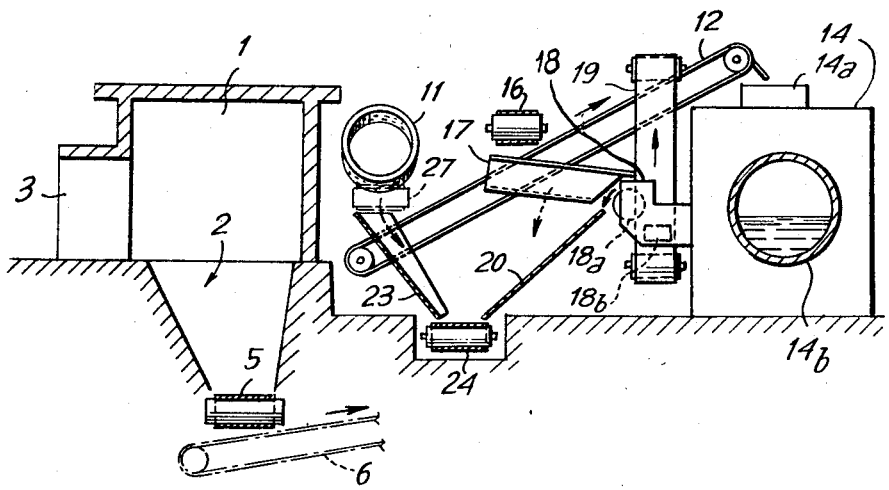
Figure 5:
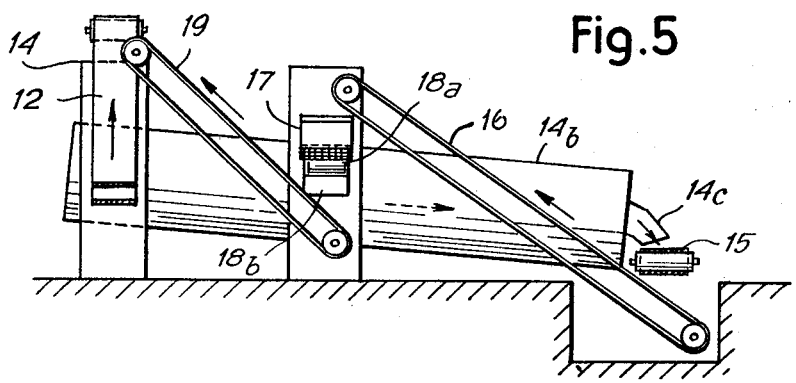

An embodiment of plant in accordance with the invention will now be described, by way of example, with reference to the accompanying diagrammatic drawings, in which:

FIG. 1 is a plan view of the plant; and
FIGS. 2, 3, 4, 5 are local sections along lines II—II, III—III, IV—IV and V—V of FIG. 1 respectively.

Referring now to the drawings, the plant includes a building 1 containing a pit 2 for storing the material which is discharged by transport means, such as vehicles of a municipal cleaning service. The vehicles have access to the pit at the openings 3, and these are backed in to enable automatic discharge of their loads into the pit. The openings 3 are closed by doors, preferably automatically controlled, and through said openings an airstream is directed inwardly when one of the doors is open for the access of a vehicle. Thus the dispersion of dust and odor is eliminated during the discharge operation. The pit 2 is sufficiently large to contain such an amount of trash as to allow for the continuous receipt of the material, even in the event of a prolonged shutdown of the plant itself, for necessary replacements, repairs and other maintenance operations. Thus the trash collection service need not be interrupted even if breakdowns and replacements occur.

The pit 2 is of hopper form, the bottom being in alignment with a conveyor 5. This conveyor can operate continuously or intermittently to feed the collected trash to the transformation plant. The conveyor 5 can discharge in the direction of an arrow $f_1$ onto a conveyor 6, which in turn discharges the material onto a lift system provided with two contiguous inclined conveyor belts 7 and 8, transfer from the one onto the other being effected through a fixed chute structure 9. The lifting of the material thus takes place in a relatively restricted or small space in a horizontal plane.

The conveyor 8 feeds the material onto a rotary sieve 11, which is arranged behind the building 1. This sieve discharges the fine material, which passes through the mesh of its perforated periphery below the sieve, while the large material is discharged through an outlet 11a onto a conveyor 12. On passing longitudinally through the sieve, the large material tends to be partly crushed, which facilitates subsequent incineration. From the conveyor 12, the material which has not passed through the sieve wall is discharged into the inlet 14a of an incineration furnace. The furnace, preferably a rotary furnace the cylindrical body 14b of which is slightly inclined, discharges the treated material from an outlet 14c. This material is picked up again by an endless conveyor 15, which discharges it onto a conveyor-elevator 16. From the elevator 16, the material falls onto a bump sieve 17, where the fine material obtained from the treatment in the furnace is separated from the large material which is discharged into an outlet 18, receiving this material. The material from the outlet 18 is first subjected to a magnetic separation by an electro-magnetic unit 18a, for the recovery of ferrous materials, and subsequently subjected to a mechanical crushing by a crusher 18b, to facilitate the combustion of the material, if it is to be recycled to the incineration furnaces. In the latter case, it is picked up by a conveyor-elevator 19, and by the latter is fed on to the conveyor 12, or directly to the furnace inlet 14a. Should the large material conveyed by the sieve 17 to the outlet 18 have already been recycled in the furnace, it may be separated being allowed to fall under gravity by, for instance, down a slope or the like, to be forwarded to the final discharge.

When the plant is operated for the production of a fertilizer, the furnace 14 may be operated so as to incinerate all the material which passes therethrough, but preferably the furnace 14 is operated to give only partial combustion of the material arriving from the sieve 11 and retained thereby. In this case, the material is at least partly broken by partial combustion and changed ready for a quick transformation into humus. Thus treated, the material has a size such that a substantial proportion falls through the bump sieve 17.

The fine material which falls from the bump sieve 17 may be received by an inclined member 20 and mixed with the fine material falling from the sieve 11, to be forwarded together to a system of fermentation and preservation silos of the fine material which is transformed into humus and used as a fertilizer. The fine material, which passes through the sieve 11, may fall directly onto an inclined member 23 and thus, together with the material which has fallen onto the inclined member 20, be collected by a conveyor 24 and conveyed by the latter to an elevator 25, to be loaded into silos 26 or other collecting containers. The material in the silos 26 can be removed from the bottom thereof, after an appropriate storage time. The material retained by the sieve 17 can be ground up and recycled in the furnace whereby it is totally transformed into ash to be combined with the humus, or it may be otherwise disposed of.

With the cycle described hereinbefore, the humus is obtained from the fine material separated by the sieve 11 which may have an organic content of from 15 to 20% and from the fine material separated by the bump sieve 17.

The sieve has a mesh to separate the material having a sufficiently fine size so that the percentage of organic substances should be between 15% and 20%. In fact, it has been surprisingly noted that in fine material having a size below certain limits, the percentage of organic materials is reduced and furthermore that a restriction of the organic content is a particularly useful condition for rapid forming of the fertilizing humus.

This operation of the plant is maintained whilst there is a demand for fertilizing material and/or there is a possibility of loading the humus into the silos 26 or other storage containers. Combustion damping means may be provided downstream of the furnace.

When fertilizers are not required, the material can be totally incinerated and the ashes appropriately removed, the amount thereof being relatively small. In this arrangement, also the fine material separated by the sieve 11 is conveyed by a conveyor 27, which may be interposed and removed from below the sieve 11, so as to be forwarded also to the furnace 14. For this purpose, the conveyor 27 may be so made as to discharge the fine material on to the conveyor 12, which receives the large material, which has not passed through the sieve 11. Under total incineration conditions, the function of the sieve 11 is useful, since the material can be partly crushed and thus the incineration thereof is facilitated.

The conveyor 27 can be pivoted to be placed, in operation, below the sieve 11 or to be excluded from this operation, so that the fine material is not collected by this conveyor 27, but falls on to the inclined member 23 and thus on to the conveyor 24 or otherwise conveyed to the silo installations. The furnace is operated for a total incineration with one or two passages.

With this arrangement, and with a simple transformation, it is possible to effect the disposal of household trash both with the total incineration system and the partial transformation into humus system and the incineration of only the non-transformable residues, or the initial partial roasting of the material in the incineration furnace, to effect a quicker transformation by the biological fermentation of the material, according to a process described in my co-pending application 568,386 filed July 28, 1966.

I claim:

1. In a trash treatment plant, sieve means including a sieve mesh adapted to treat all coarse material collected, furnace means adapted for effecting at least partial combustion of the trash, storage means for accommodating material delivered from the furnace means and the material passing through the sieve means, conveyor means for selectively delivering either all of the trash which has been treated by the sieve means to the furnace means when the latter is operating to give complete combustion or delivering that portion of the trash which does not pass through the sieve mesh to the furnace means and delivering the portion that passes through the sieve mesh to the storage means when the furnace means is operating to produce partial combustion, and means for delivering ash from the furnace to the storage means.

2. In a plant according to claim 1, separating means arranged to separate coarse and fine material delivered from the furnace means, and means for recycling the coarse material to the furnace means.

3. A plant according to claim 1, wherein said conveyor means for selective delivery comprises first conveyor means for delivering coarse material retained by the mesh of the sieve means to the furnace means, second conveyor means below the sieve means to collect and deliver the fine material falling from the sieve means to said storage means, and movable means which can be positioned below the sieve means and above said second conveyor means, to collect and deliver fine material from the sieve means to said first conveyor means or alternatively moved from below the sieve means to an alternative inoperative position.

4. In a plant according to claim 1, a bump sieve for receiving incinerated material from said furnace means and separating said incinerated material into coarse and fine portions, magnetized means for separation and recovery of ferrous items, grinding means for treating the coarse portion retained in the bump sieve, and a conveyor for recycling the coarse portion to the furnace means.

References Cited

UNITED STATES PATENTS

| | | |
|---|---|---|
| 634,200 | 10/1899 | Cummer. |
| 2,040,416 | 5/1936 | Upson _____ 110—8 |
| 2,212,062 | 8/1940 | Duerr et al. _____ 110—14 X |

JAMES W. WESTHAVER, *Primary Examiner.*